(12) United States Patent
Selca et al.

(10) Patent No.: US 7,546,291 B2
(45) Date of Patent: Jun. 9, 2009

(54) DATA SOURCE TASK PANE

(75) Inventors: Vitore Selca, Seattle, WA (US); Christopher W. Bryant, Seattle, WA (US); Richard L. Dickinson, Seattle, WA (US); Richard Shawn McDowell, North Bend, WA (US); Zachary P. Woodall, Issaquah, WA (US); Michael J. McCormack, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 11/317,648

(22) Filed: Dec. 22, 2005

(65) Prior Publication Data

US 2006/0161533 A1 Jul. 20, 2006

Related U.S. Application Data

(63) Continuation-in-part of application No. 11/231,260, filed on Sep. 20, 2005, which is a continuation-in-part of application No. 11/169,856, filed on Jun. 29, 2005, and a continuation-in-part of application No. 10/782,074, filed on Feb. 19, 2004, now Pat. No. 7,225,189.

(60) Provisional application No. 60/716,051, filed on Sep. 9, 2005.

(51) Int. Cl.
*G06F 17/30* (2006.01)
*G06F 7/00* (2006.01)
(52) U.S. Cl. .................. 707/3; 707/101; 707/102
(58) Field of Classification Search .............. 707/3, 707/101, 102
See application file for complete search history.

(56) References Cited

U.S. PATENT DOCUMENTS

| | | | |
|---|---|---|---|
| 5,121,499 A | 6/1992 | McCaskill et al. | 715/503 |
| 5,175,810 A | 12/1992 | Young et al. | 715/509 |
| 5,247,611 A | 9/1993 | Norden-Paul et al. | 707/504 |
| 5,255,356 A | 10/1993 | Michelman et al. | 707/504 |
| 5,319,777 A * | 6/1994 | Perez | 707/10 |
| 5,359,729 A | 10/1994 | Yarnell et al. | 707/2 |
| 5,396,587 A | 3/1995 | Reed et al. | 707/503 |
| 5,418,898 A | 5/1995 | Zand et al. | 707/503 |
| 5,418,902 A | 5/1995 | West et al. | 707/503 |
| 5,455,853 A * | 10/1995 | Cebulka et al. | 379/201.03 |
| 5,471,575 A | 11/1995 | Giansante | 707/503 |
| 5,510,980 A | 4/1996 | Peters | 707/503 |
| 5,535,324 A | 7/1996 | Alvarez et al. | 707/503 |

(Continued)

FOREIGN PATENT DOCUMENTS

WO   WO 00/60484   10/2000

OTHER PUBLICATIONS

Louis Davison: Professional SQL Server 2000 Database Design, Wrox Press Ltd.®, 2001.*

(Continued)

*Primary Examiner*—Kuen S. Lu
(74) *Attorney, Agent, or Firm*—Merchant & Gould P.C.

(57) ABSTRACT

A user interface is provided that allows users to create queries interactively. The user interface operates by creating a source query (or, for example, SQL commands) for the user while they select fields from a data source. This provides users with an alternative to using conventional designers, wizards, or other tools to manually generate a query.

19 Claims, 10 Drawing Sheets

U.S. PATENT DOCUMENTS

| | | | |
|---|---|---|---|
| 5,553,215 A | 9/1996 | Kaethler | 707/503 |
| 5,598,519 A | 1/1997 | Narayanan | 707/504 |
| 5,600,584 A | 2/1997 | Schlafly | 707/504 |
| 5,604,854 A | 2/1997 | Glassey | 707/504 |
| 5,649,192 A | 7/1997 | Stucky | |
| 5,685,001 A | 11/1997 | Capson et al. | 707/503 |
| 5,701,499 A | 12/1997 | Capson et al. | 707/503 |
| 5,708,827 A | 1/1998 | Kaneko et al. | 707/503 |
| 5,740,370 A | 4/1998 | Battersby et al. | |
| 5,752,253 A | 5/1998 | Geymond et al. | 707/503 |
| 5,758,337 A | 5/1998 | Hammond | |
| 5,768,158 A | 6/1998 | Adler et al. | 716/11 |
| 5,812,983 A | 9/1998 | Kumagai | 707/503 |
| 5,819,293 A | 10/1998 | Comer et al. | 707/503 |
| 5,838,965 A | 11/1998 | Kavanagh et al. | |
| 5,881,381 A | 3/1999 | Yamashita et al. | 707/503 |
| 5,890,174 A | 3/1999 | Khanna et al. | 707/504 |
| 5,913,033 A | 6/1999 | Grout | 709/219 |
| 5,920,725 A | 7/1999 | Ma et al. | 717/181 |
| 5,926,822 A | 7/1999 | Garman | 707/504 |
| 5,944,789 A | 8/1999 | Tzelnic et al. | |
| 5,966,716 A * | 10/1999 | Comer et al. | 707/203 |
| 5,987,481 A | 11/1999 | Michelman et al. | 707/503 |
| 6,055,548 A | 4/2000 | Comer et al. | 707/538 |
| 6,055,549 A | 4/2000 | Takano | 707/503 |
| 6,070,177 A * | 5/2000 | Kao et al. | 715/500 |
| 6,112,214 A | 8/2000 | Graham et al. | 707/539 |
| 6,134,552 A | 10/2000 | Fritz et al. | 707/10 |
| 6,134,563 A | 10/2000 | Clancey et al. | 707/503 |
| 6,134,583 A | 10/2000 | Herriot | 709/217 |
| 6,138,130 A | 10/2000 | Adler et al. | 707/504 |
| 6,151,601 A | 11/2000 | Papierniak et al. | |
| 6,151,624 A | 11/2000 | Teare et al. | |
| 6,216,139 B1 | 4/2001 | Listou | 707/503 |
| 6,292,811 B1 | 9/2001 | Clancey et al. | 707/538 |
| 6,334,158 B1 | 12/2001 | Jenny et al. | 719/328 |
| 6,374,268 B1 | 4/2002 | Testardi | |
| 6,477,527 B2 * | 11/2002 | Carey et al. | 707/4 |
| 6,510,439 B1 | 1/2003 | Rangarajan et al. | |
| 6,542,933 B1 | 4/2003 | Durst, Jr. et al. | |
| 6,567,822 B1 * | 5/2003 | Cudahy et al. | 707/104.1 |
| 6,640,234 B1 | 10/2003 | Coffen et al. | 707/538 |
| 6,694,321 B1 * | 2/2004 | Berno | 707/101 |
| 6,785,704 B1 | 8/2004 | McCanne | |
| 6,820,088 B1 | 11/2004 | Hind et al. | |
| 7,062,502 B1 * | 6/2006 | Kesler | 707/102 |
| 7,139,768 B1 | 11/2006 | Janzig et al. | |
| 7,174,327 B2 * | 2/2007 | Chau et al. | 707/3 |
| 2002/0049764 A1 | 4/2002 | Boothby et al. | |
| 2002/0052769 A1 | 5/2002 | Navani et al. | |
| 2002/0063734 A1 | 5/2002 | Khalfay et al. | |
| 2002/0087729 A1 | 7/2002 | Edgar | 709/246 |
| 2002/0184043 A1 * | 12/2002 | Lavorgna et al. | 705/1 |
| 2003/0046366 A1 | 3/2003 | Pardikar et al. | |
| 2003/0145224 A1 | 7/2003 | Bailey | |
| 2003/0154191 A1 | 8/2003 | Fish et al. | 707/2 |
| 2003/0154197 A1 | 8/2003 | Millet et al. | 707/9 |
| 2003/0158947 A1 | 8/2003 | Bloch et al. | |
| 2003/0159089 A1 | 8/2003 | DiJoseph | 714/38 |
| 2003/0225758 A1 | 12/2003 | Yamasaki | 707/3 |
| 2004/0001106 A1 * | 1/2004 | Deutscher et al. | 345/830 |
| 2004/0039743 A1 * | 2/2004 | Maleport et al. | 707/10 |
| 2004/0103365 A1 * | 5/2004 | Cox | 715/503 |
| 2004/0138815 A1 * | 7/2004 | Li et al. | 702/2 |
| 2004/0172424 A1 | 9/2004 | Edelstein et al. | 707/201 |
| 2004/0193969 A1 | 9/2004 | Nemoto et al. | |
| 2004/0236777 A1 | 11/2004 | Pardikar et al. | |
| 2005/0034064 A1 * | 2/2005 | Meyers et al. | 715/513 |
| 2005/0069361 A1 | 3/2005 | Wang et al. | |
| 2005/0080823 A1 | 4/2005 | Collins | 707/200 |
| 2005/0091253 A1 * | 4/2005 | Cragun et al. | 707/102 |
| 2005/0187897 A1 | 8/2005 | Pawar et al. | |
| 2005/0228990 A1 | 10/2005 | Kato et al. | |
| 2006/0020586 A1 | 1/2006 | Prompt et al. | |
| 2006/0155705 A1 | 7/2006 | Kamper et al. | 707/8 |
| 2006/0168325 A1 | 7/2006 | Wood et al. | 709/238 |
| 2006/0168557 A1 * | 7/2006 | Agrawal et al. | 717/104 |
| 2006/0242189 A1 * | 10/2006 | Leetaru et al. | 707/102 |
| 2006/0259506 A1 | 11/2006 | Kim | 707/102 |
| 2007/0198657 A1 | 8/2007 | Saliba et al. | |

OTHER PUBLICATIONS

Anonymous, "Method and Apparatus for Automatic Character Line Fill of Decimal Fields." IBM Technical Disclosure Bulletin vol. 36, No. 10, pp. 155-156, Oct. 1993.

Miastkowski, S. "Excel 5.0—a Quick-start Guide to Using Excel's Powerful New Features." Macworld vol. 11, No. 10, pp. 146-151, Oct. 1994.

Microsoft Corp. Help File on 'Series' 'Repeated Entries', and 'Auto Fill' (screen shot) of Microsoft Excel 97 (1996), taken Mar. 2001, 6 pp.

Crew, Ed, ed. "Lesson in Excel 97: Lesson One . . . ", Web page tutorial on Excel 97 downloaded from pathways.uwe.ac.uk/Edict/Excel/Excel-01.asp on Mar. 29, 2002, 6 pp.

Sonic.net. "Microsoft Excel 5.0 (Tips on Using MS Excel 5.0 Repeat Entries)" downloaded from www.sonic.net/.about.sbaurmann/excel.html on Apr. 2, 2002, 5 pp.

Microsoft Office 2000/Visual Basic Programmer's Guide, "Creating Dynamic Reports with Query Tables in Excel", http://msdn.microsoft.com/library/en-us/odeopg/html/deconcreatingdynamicreportswithq..., downloaded May 16, 2006, 2 pp.

Khor, "Microsoft Office Excel 2003 Preview", Jun. 2003, http://msdn.microsoft.com/library/en-us/odc_x12003_ta/html/odc_xlov.asp?frame=true, downloaded May 16, 2006, 19 pp.

U.S. Appl. No. 10/667,543, filed Sep. 22, 2003 entitled "Extension of Formulas and Formatting in an Electronic Spreadsheet".

U.S. Appl. No. 10/782,074, filed Feb. 19, 2004 entitled "Data Source Write back and Offline Data Editing and Storage in a Spreadsheet".

U.S. Appl. No. 11/169,856, filed Jun. 29, 2005 entitled "Modifying Table Definitions Within a Database Application".

U.S. Appl. No. 11/300,728, filed Dec. 15, 2005 entitled "Offline Multi-Table Data Editing and Storage System".

U.S. Appl. No. 11/231,260, filed Sep. 20, 2005 entitled "Templates in a Schema Editor".

Official Action in U.S. Appl. No. 10/667,543 mailed Feb. 15, 2006.

Official Action in U.S. Appl. No. 10/667,543 mailed Aug. 2, 2006.

Louis Davidson; "Professional SQL Server 2000 Database Design"; Wrox Press Ltd., 464 pgs.

U.S. Official Action mailed Oct. 16, 2007 on U.S. Appl. No. 11/231,260.

U.S. Official Action mailed Jan. 9, 2008 in U.S. App. No. 11/300,728.

U.S. Official Action mailed Oct. 3, 2007 in U.S. Appl. No. 11/169,856.

PCT International Search Report in PCT/US2007/002662 mailed Jul. 5, 2007.

Davidson, "Professional SQL Server 2000 Database Design", Wrox Press Ltd., 2001, 464 pp.

"Mapping Windows XP Professional to Your Business Needs", Microsoft: Windows XP Resource Kits, http://www.microsoft.com/resources/documentation/Windows/XP/all/reskit/en-us/Default.asp?url=/resources/documentation/Windows/XP/all/reskit/en-us/prba_dwp_tnvo.asp, printed Dec. 15, 2005, 8 pp.

Strong, Craeg, "Release Information", http://www.zope.org/Members/arielpartners/CVSFile/readme/document_view, Apr. 2003, 6 pp.

Onion, Fritz, "Understanding Paths in ASP.NET", Informit.com, http://www.informit.com/articles/article.asp?p=101145&redir=1, Sep. 2003, 4 pp.

U.S. Official Action in U.S. Appl. No. 11/343,957 mailed Jan. 15, 2008.

U.S. Official Action in U.S. Appl. No. 11/231,260, Selca et al., mailed Jul. 18, 2008, 34 pgs, (14917.0202US11).

U.S. Official Action in U.S. 11/169,856, Selca et al., (14917.0109US01), mailed in Jul. 21, 2008, 7 pgs.

\* cited by examiner

FIG. 6

DATA SOURCE TASK PANE

CROSS-REFERENCE TO RELATED APPLICATIONS

This patent application claims priority to U.S. patent application Ser. No. 60/716,051 filed Sep. 9, 2005, entitled "Offline Multi-Table Data Editing and Storage System," which is a continuation-in-part of U.S. patent application Ser. No. 10/782,074, filed Feb. 19, 2004, entitled "Data Source Write Back and Offline Data Editing and Storage in a Spreadsheet," the disclosures of which are expressly incorporated herein by reference.

This patent application is a continuation-in-part of U.S. patent application Ser. No. 11/231,260 filed Sep. 20, 2005, entitled "Templates in a Schema Editor," which is a continuation-in-part of U.S. patent application Ser. No. 11/169,856, filed Jun. 29, 2005, entitled "Modifying Table Definitions within a Database Application," the disclosures of which are expressly incorporated herein by reference.

BACKGROUND

Users having different levels of ability often create and modify user data by using database applications that have a database engine. The users create tables to store the database information, and once a table is created, it is often difficult to change or modify the definition of a table in a way that is intuitive for users and is easy to use. A schema is typically used to define a table, and schema modification options and/or dialog are often very closely dependent upon database applications. The database applications often require a high level of skill and core knowledge of database concepts in order to manipulate the database application. Thus, users who are not familiar with formal database theory, or who do not have experience in database design, often need help in determining and setting data types and other features based on their input data.

Query design tools often force the user to design the query as a preliminary step to creating the view on data (formatted report or form) that they want. This preliminary step is not intuitive for most users and creates extra work for the user. Conventional query tools use "designer" and "wizard" paradigms for creating queries. In abstract "designers" the user is separated from their data and has a diminished sense of the query result. Wizards step users through the process of creating a new query, which provides a one-shot chance at getting the query elements they want. However, wizards often provide results that are even more removed from the resulting query results than when using a designer.

Additionally, conventional database applications typically modify tables when a user is not viewing the data. Thus, a user of a previous version typically does not explicitly set the data type or size of the field or formatting options within table browse. Also, data types of the data entered are evaluated after the user closes the table. Often, a user is prohibited from making changes to the structure of a table while a database object that depends on the table, such as a form or query, is open. Thus, in order to modify the schema of the table, data objects depending on the table typically have to be closed so that no other applications are using the table. For example, when a user tries to modify a table while a dependent report is open, the user may receive a somewhat arbitrary notice to close the report and the table. This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to one aspect, a first field that is associated with a primary table and a second field that is associated with secondary table are displayed on a user interface. A user creates a relationship between the fields using the user interface. A query generator generates a query for producing a results set from the primary and secondary tables.

According to another aspect, a display is used to show first field from a primary table and a second field from a secondary table. A user interface is used to receive commands from the user for the user that allows the user to create a relationship between the first and second fields and to change the display in response to the user's commands. A query generator generates a query for producing a results set from the primary and secondary tables in accordance with the relationship between the first and second fields.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 3 illustrates an exemplary display for a two pane task pane;

FIG. 4 illustrates a first display of an example process of adding a field to a table using a data source task pane;

FIG. 5 illustrates a second display of an example process of adding a field to a table generated using a data source task pane;

FIG. 6 illustrates a third display of an example process of adding a field to a table generated by a schema editor;

DETAILED DESCRIPTION

Figure 1:
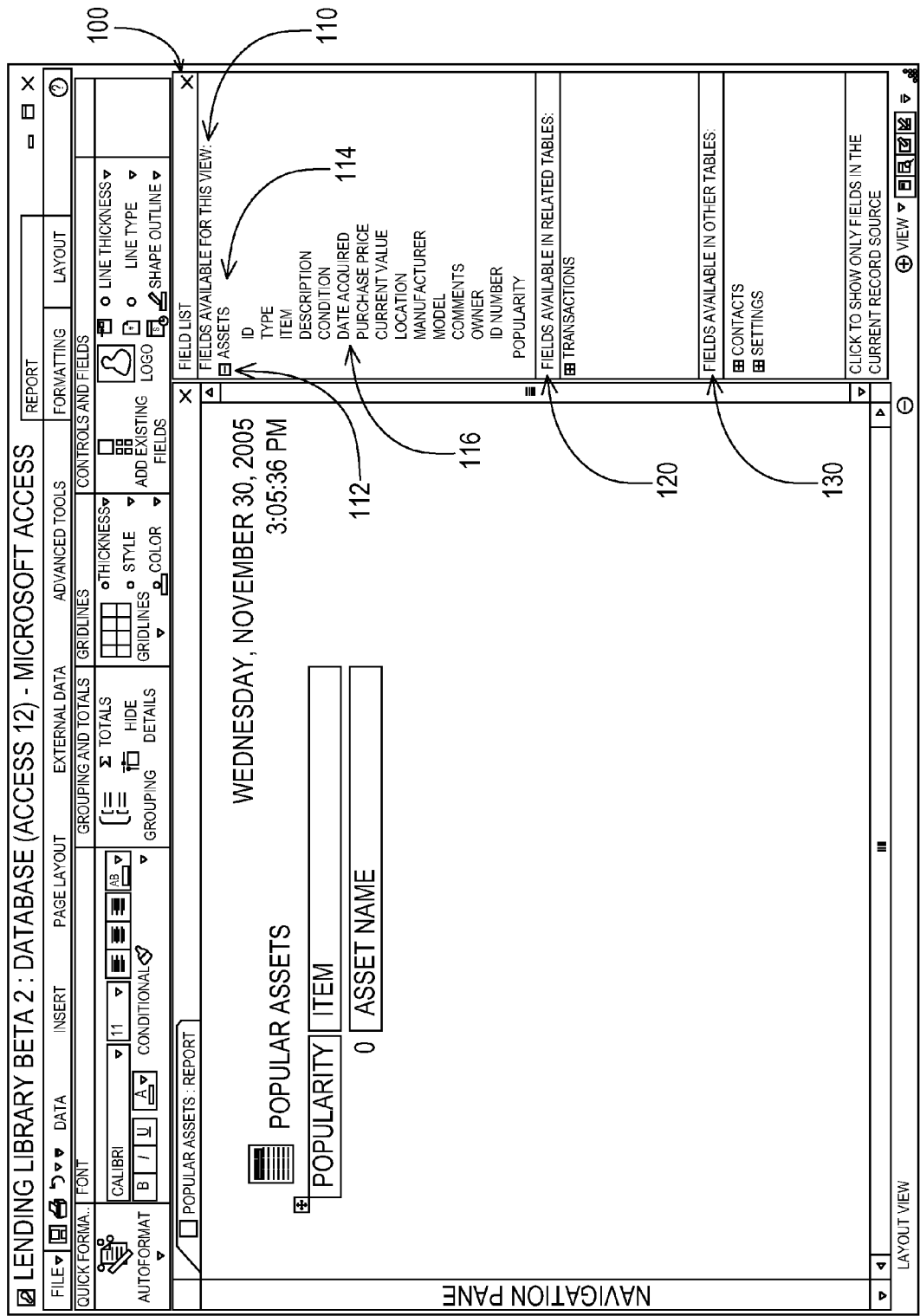
FIG. 1 illustrates an exemplary data source task pane.

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Data is typically stored on computer systems in an organized fashion, which allows the data to be sorted, manipulated, and displayed in response to user's commands. Such data can be stored using database systems, which provide commands for users to manipulate the data. Additionally, schema can be used to define how data is to be stored and accessed. In the recent past, directly coding schema and manipulating database information required knowledge of programming languages, which typical users do not possess, and can be inefficient for those who do possess such knowledge. Database designers can also be used, but restrict the ability to access data and database structures at the same time.

In various embodiments, a data source task pane (DSTP) is provided that allows for creating queries interactively. In one embodiment, the DSTP is a task pane that is available in Access® views such as when browsing forms, reports, tables, and the like. The DSTP has a clear visual presentation of the tables (data sources) in the database such that users can drag fields from multiple sources onto their view. The fields available in the view are clearly distinguished from other fields in the database.

The DSTP operates by creating a source query (or, for example, SQL commands) for the user while they drag fields from a data source. This provides users with an alternative to using designers, wizards, or other tools to manually generate a query. Users see query results (data) represented immediately in their view. Accordingly, the DSTP allows users to create the query judging by the results and presentation they get in their view. The DSTP also presents visual cues when users drag fields, allowing them to drop fields into the correct location on the view to get the result they desire.

Exemplary Data Source Task Pane

FIG. 1 illustrates an exemplary data source task pane. In one embodiment, task pane 100 is implemented on a computer system, such as a computer that is networked to a database. Task pane 100 is used to show, for example, database fields that can be used to construct queries. Task pane 100 displays available fields from which a user can select (by dragging and dropping, for example) in order to create a desired database query.

Task pane 100 organizes data source into categories that are easily understood by users. Task pane 100 organizes the fields into three panes: fields available in this view (110), fields available in related tables (120), and fields available in other tables (130). Organizing the fields as shown helps users to quickly locate desired fields according to the users' knowledge or intuition of the relationships of a desired field. Other embodiments may omit grouping in panes or combine the various groupings.

Table 1 below describes the panes for fields in view, related tables, and other tables.

TABLE 1

| Pane | Description |
| --- | --- |
| Fields in View | Displays all the fields that currently exist in the row source for the current view.<br>Fields can be displayed as:<br>    Flat list: display only fields available for object.<br>    Hierarchically: display of tables in the row source in a tree view. |
| Related Tables | Hierarchically displayed tables that are related to the tables displayed in the "Fields in View" pane. Task panes typically only list the tables that are directly related. The task panes do not usually traverse the relationship graph to display secondary or tertiary relationships. |
| Other Tables | Hierarchical displays of all other tables in the database that were not listed in the previous two panes. |

The user can be further helped in generation of a query by distinguishing fields in the data source that are already in the query from other fields from the same tables but that are not currently used. The fields can be distinguished from each other by, for example, bolding, changing the color, font size, and the like of only previously selected fields while not emphasizing unselected fields. Additionally, a hyperlink in the task pane can be used to enable the user to filter the fields show such that a flat list of only the fields in the query is displayed in response.

In a query, expressions are displayed to reveal to which table a displayed field belongs. For example, an expression can be used to express a full name by specifying a first name, a space, and then last name, where the first name and last name are fields of the database. A user, seeing a full name displayed, is shown the expression that causes the full name to be displayed. The user can then, for example, simply add the middle name by modifying the expression (without having to take the trouble to determine the underlying structure of the full name).

Also, aliases can be disambiguated by displaying the table from which an aliased field is derived. For example, the field "title" could refer to a field in a contact table and also refer to the "title" of an issue field in an issues table. Accordingly, aliases are also displayed to reveal to which table a displayed field belongs.

The displayed fields from tables are displayed in a tree structure in order to show relationships. For example, the top pane in the tree organizes fields that belong to contacts under contacts and all the fields that belong to issues under issues. Additionally, there are certain fields that may be in the query for which they belong to both issues and contacts. When an expression pulls one field from issues and one field from contacts and concatenates them together (as in the "full name" example above), the expression's fields can be placed separately in a list of fields in a table that has either zero or more than one owner.

Another issue that arises when combining fields from separate tables is how to join tables that are being related. (For example, inner joins only join rows that are common to participating tables, whereas outer joins combine all rows.) If no relationship can be established by traversing trees associated with the fields, the user can be prompted for join information.

For example, the user can be prompted to choose a field from any field that is currently in the top pane of the data source task pane.

Another issue that can arise is that two tables may be related via multiple relationships. For example, "Issues" is a primary table, and "Contacts" is a secondary table. The issues table has three fields (e.g., "foreign keys"): Assigned To, Opened By, and Resolved By. Each of these fields relates to and/or stores a value to the Contact Id field in the Contacts table. If the user creates a view on the Issues table, Contacts will normally appear in the "related tables" section. However, when the user drags from Contacts, the DSTP will prompt them to choose which of the existing relationships it should use to create the join.

The user is given the option to change the type of join that is created such that automatically (and manually) specified joins can be modified as the user desires. To assist the user, a user interface can show the existing type of join and hierarchical relationships and receive inputs from the user by which the join relationships are specified. The user interface can be invoked, for example, when a field from a first table is dragged and dropped on a table view of a second table such that the user can specify system relationships between the two tables. (In this way, the user does not need to return to a wizard to specify the relationships, as discussed above.)

The user is also assisted by visual cues provided to the user as the field is being dragged. For example, legitimate insertion points can be highlighted as the field is being dragged to a form or a report. The type of action to be performed may change based on the drop point, so the type of action (such as whether a new report group or a new subform on a form is to be created) to be performed can be shown in response to the cursor location. A preview of the resulting form can be shown using "ghosting" or other means of showing a provisional display. The information for the visual cues can be determined from information within the DSTP.

As shown in FIG. 1, fields can be displayed as a two-level hierarchy. Entry 114 has a clickable control for displaying (or hiding) further information about the (higher level) entry 114. For example, "Assets" entry 114 is associated with control 112, which is displayed as a "minus sign" box. The minus sign box indicates that the "Assets" entry has been expanded to show further information (sub-entries 116) associated with entry 114. The further information in this example includes issue types such as assigned to, ID, Type, Item, Description, and the like. Control 112 can be clicked for the purpose of hiding the expanded list, which contains the further information.

Figure 2:
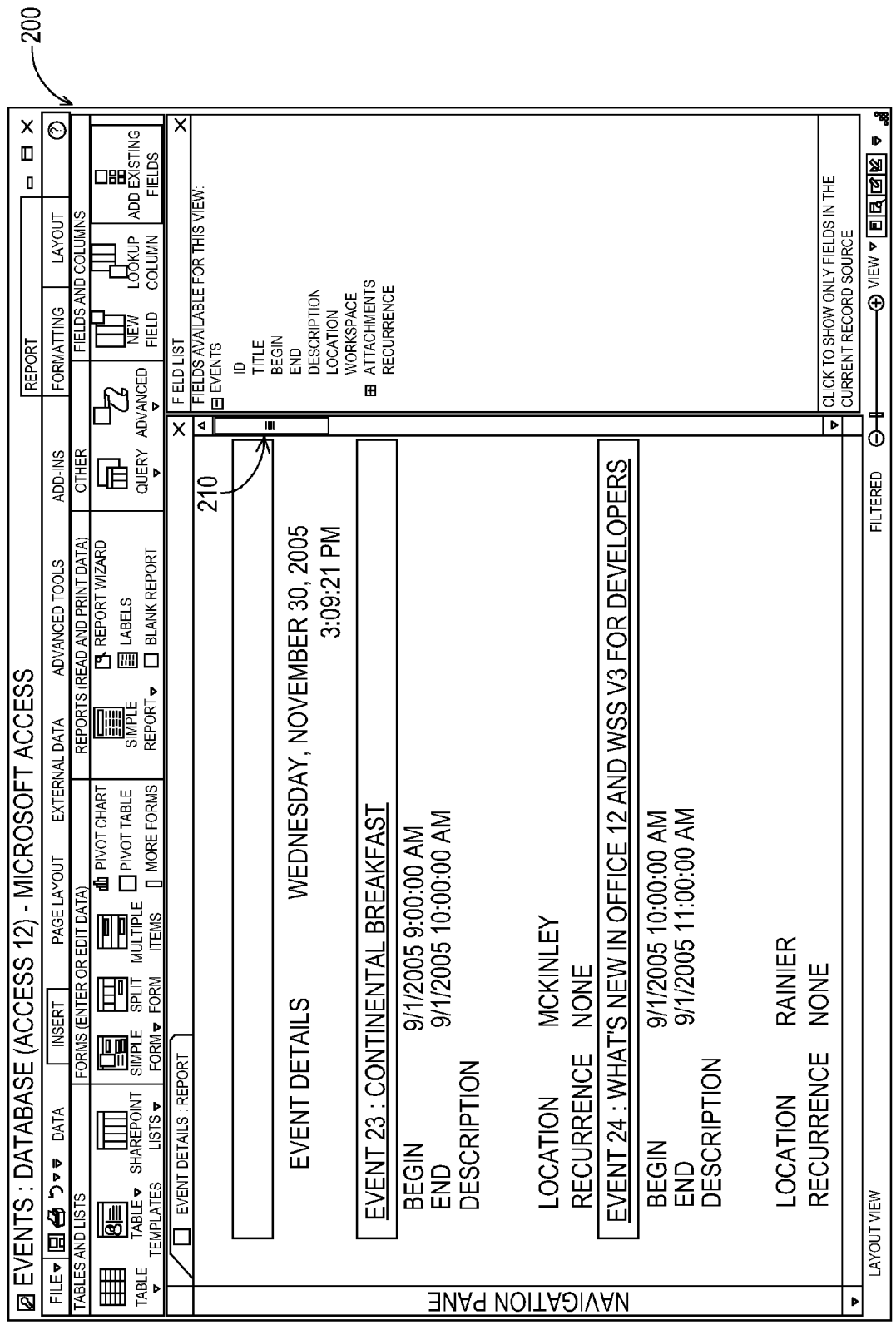
FIG. 2 illustrates an exemplary display for a one pane task pane.

FIG. 2 illustrates an exemplary display for a one pane task pane. Task pane 200 is a "one pane" view as described above. The one pane view can also apply to flat lists (without expansion controls) and cases where related/other table panes are empty. Task pane 200 comprises panel 210, which currently displays the text "Fields available for this view." The user, for example, can populate task pane 200 with fields by selecting a table from which to drag fields.

Figure 3:
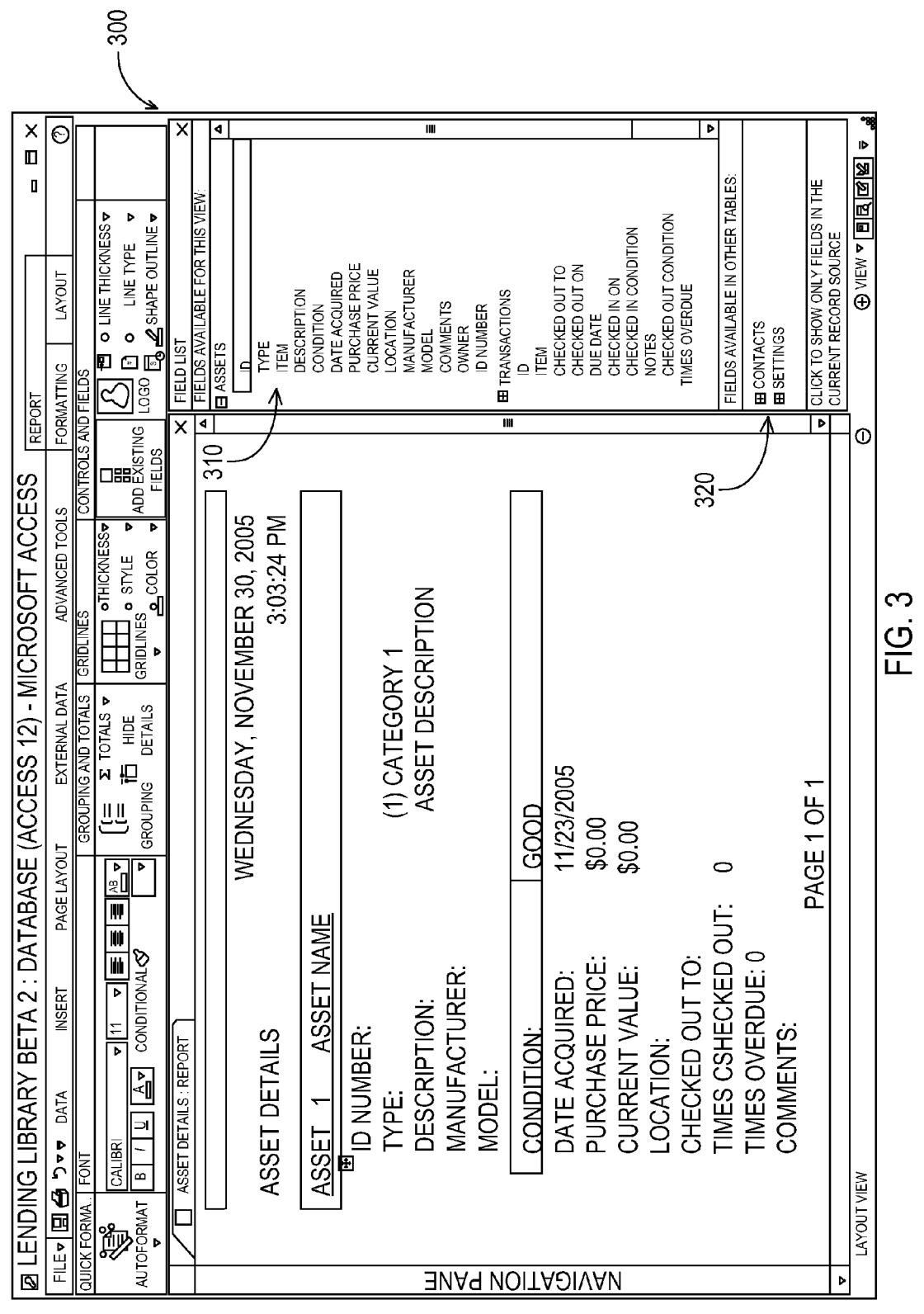

FIG. 3 illustrates an exemplary display for a two pane task pane. Task pane 300 is a two pane view, which can apply to cases where either related or unrelated tables are available. Task pane 300 comprises panel 310, which currently displays the text "Fields available for this view." Panel 320 contains fields available in related tables ("Contacts" and "Settings," for example) from which the user, can populate a view with fields from the related tables.

Table 2 below illustrates various relationships between possible views and types (e.g. flat or hierarchical, number of panes, and the like) of task panes.

TABLE 2

| View Type | Record Source | Show | Description |
| --- | --- | --- | --- |
| Datasheet | Table | Yes | 2 panes: related and other tables |
| | Query | No | N/A |
| Form | SQL: SELECT from tables | Yes | 3 panes: hierarchical list |
| | SQL: SELECT from tables and queries | Yes | 1 pane: flat list |
| | Query: SELECT from tables | Yes | 3 panes: hierarchical list |
| | Query: SELECT from tables and queries | Yes | 1 pane: flat list |
| | Table | Yes | 1 pane: flat list |
| Report | Same as form | Yes | Same as form |
| Sub-Form/Report | Same as form/report | Yes | Exceptions: table objects When bound to a table object, the sub-form/sub-report appears as a white box in design view. |

Figure 4:
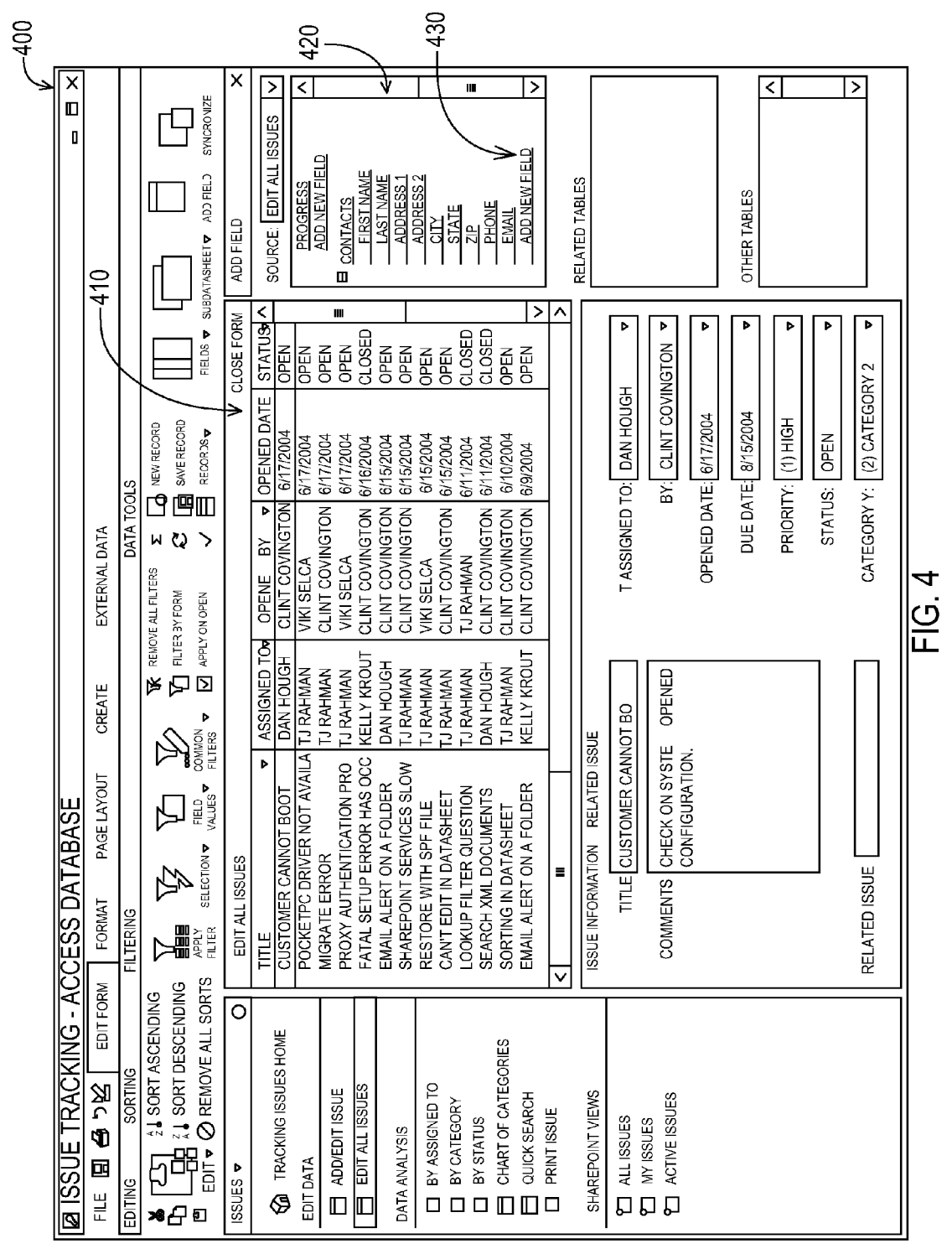

FIG. 4 illustrates a first display of an example process of adding a field to a table using a data source task pane. Display 400 comprises a table (410) for listing "issues" in a computer system. A user can first verify that a field to be added does not exist in data source task pane 420. Next the user can click on the add field link (430) in the bottom of the list of fields for the table. The schema editor opens a display as illustrated in FIG. 5.

Figure 5:
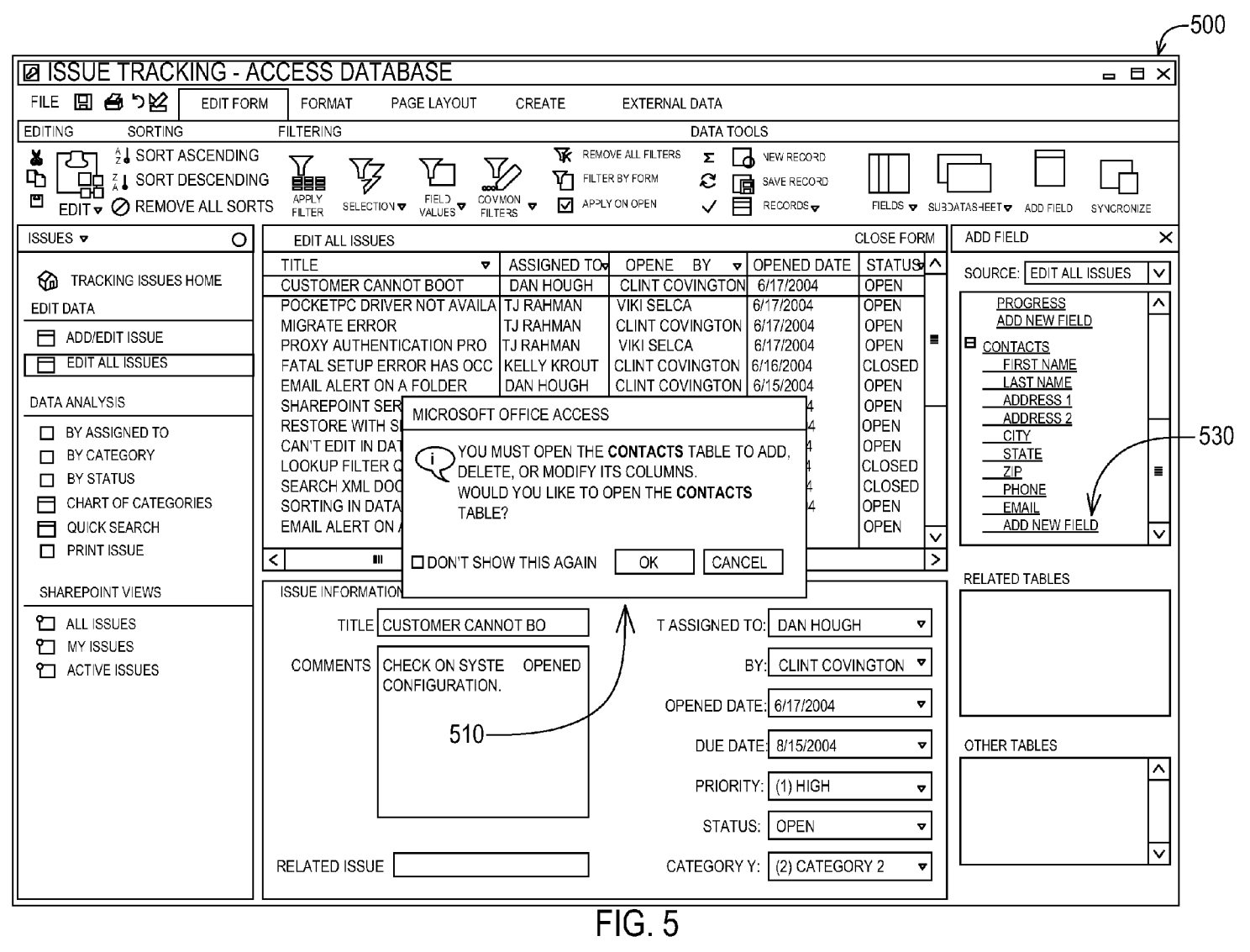

FIG. 5 illustrates a second display of an example process of adding a field to a table generated using a data source task pane. Clicking on link 530 in display 500 causes dialog box 510 to open that prompts the user to determine whether the user wants to open the table to add a field to the table. When the user answers in the affirmative, the user interface opens a display as shown in FIG. 6.

Figure 6:
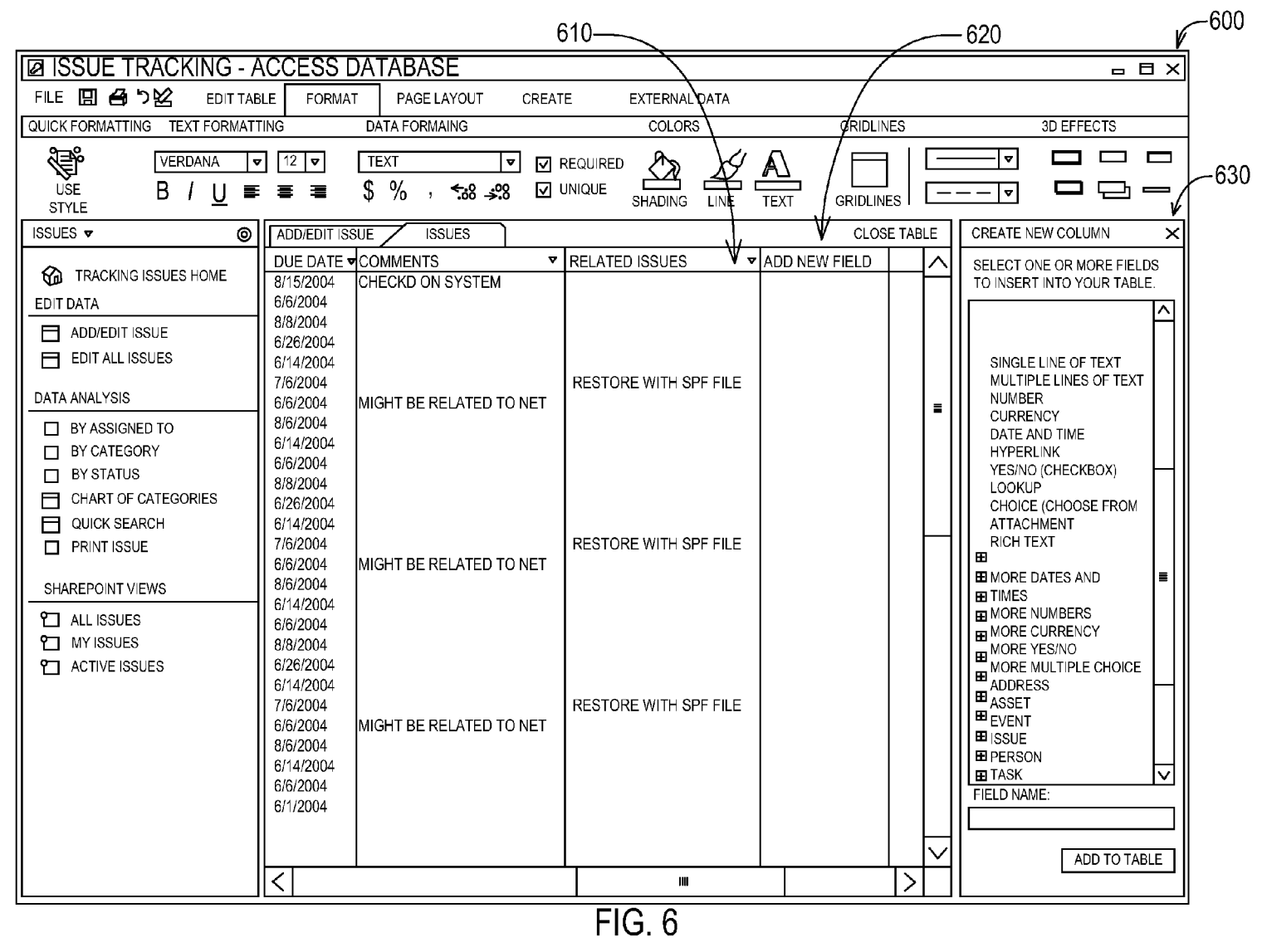

FIG. 6 illustrates a third display of an example process of adding a field to a table generated by a schema editor. Clicking "OK" in dialog box 510 causes display 600 to be opened. Display 600 illustrates that table 610 is opened with a focus on field 620, (which is in the "Add New Field" column). Also, when the table is opened a new "add field" task pane (630) is opened to provide the user with information to define schema (e.g., to use predefined templates for the table). When the user closes table 610, the field is available in the data source task pane 730 as shown in FIG. 7.

Figure 7:
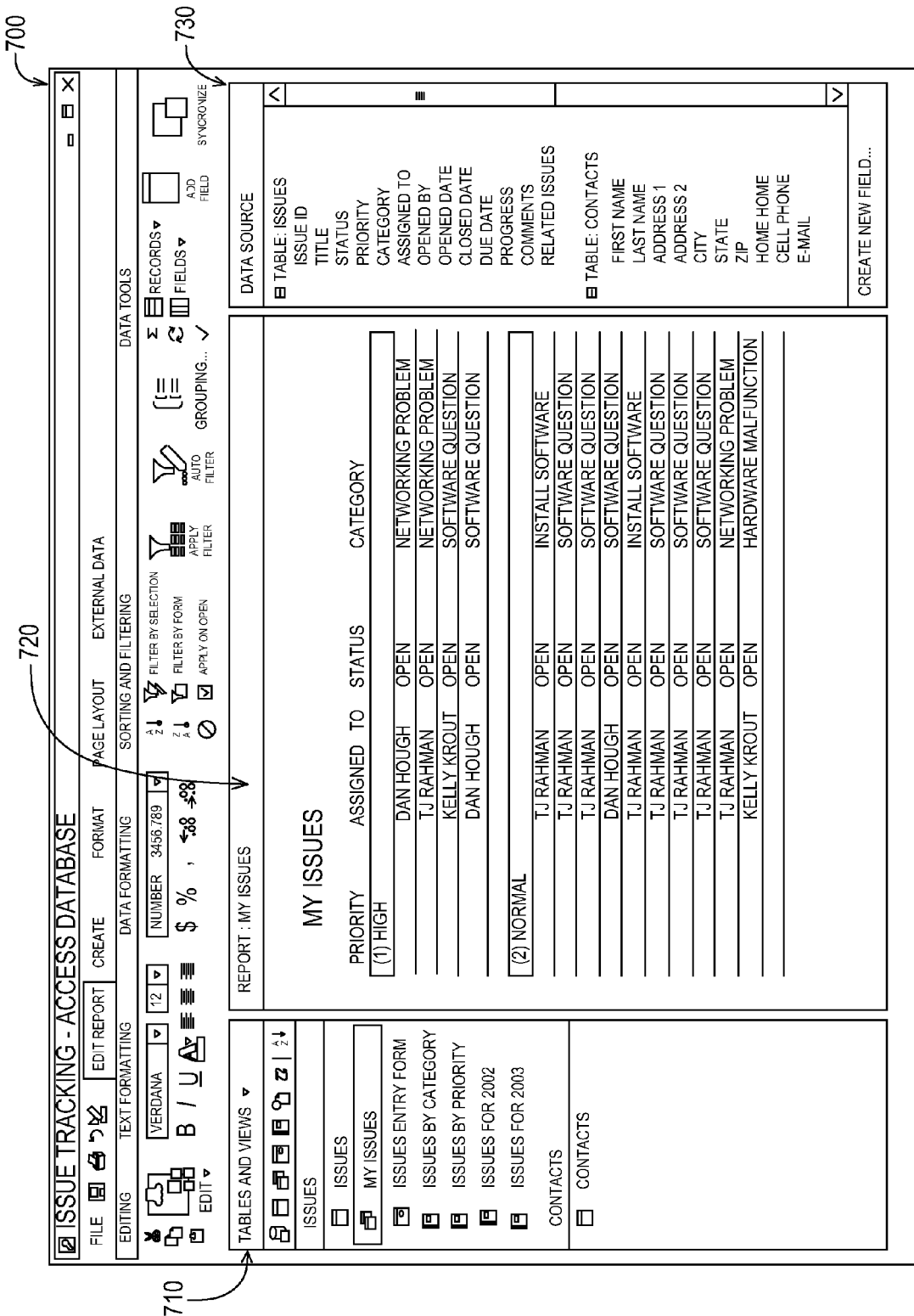
FIG. 7 illustrates a display of an alternative user interface for adding a field to a table.

FIG. 7 illustrates a display of an alternative user interface for adding a field to a table. Display 700 is an alternative user interface that allows a query to be created and/or modified in the context of a form. Display 700 comprises navigation pane 710, form 720, and data source task pane 730.

Creating/Modifying a query in the context of a form allows the user to create/modify table schema in place such that the user does not have to "navigate away" from the current view (which would distract the user). Selecting button 740 ("Create Field") instantiates a dialog used for creating/modifying the schema (as compared to the task pane process as illustrated in the process of FIGS. 4-6). The content is that the user can select to create/modify the schema templates as well as other user-provided input.

Figure 8:
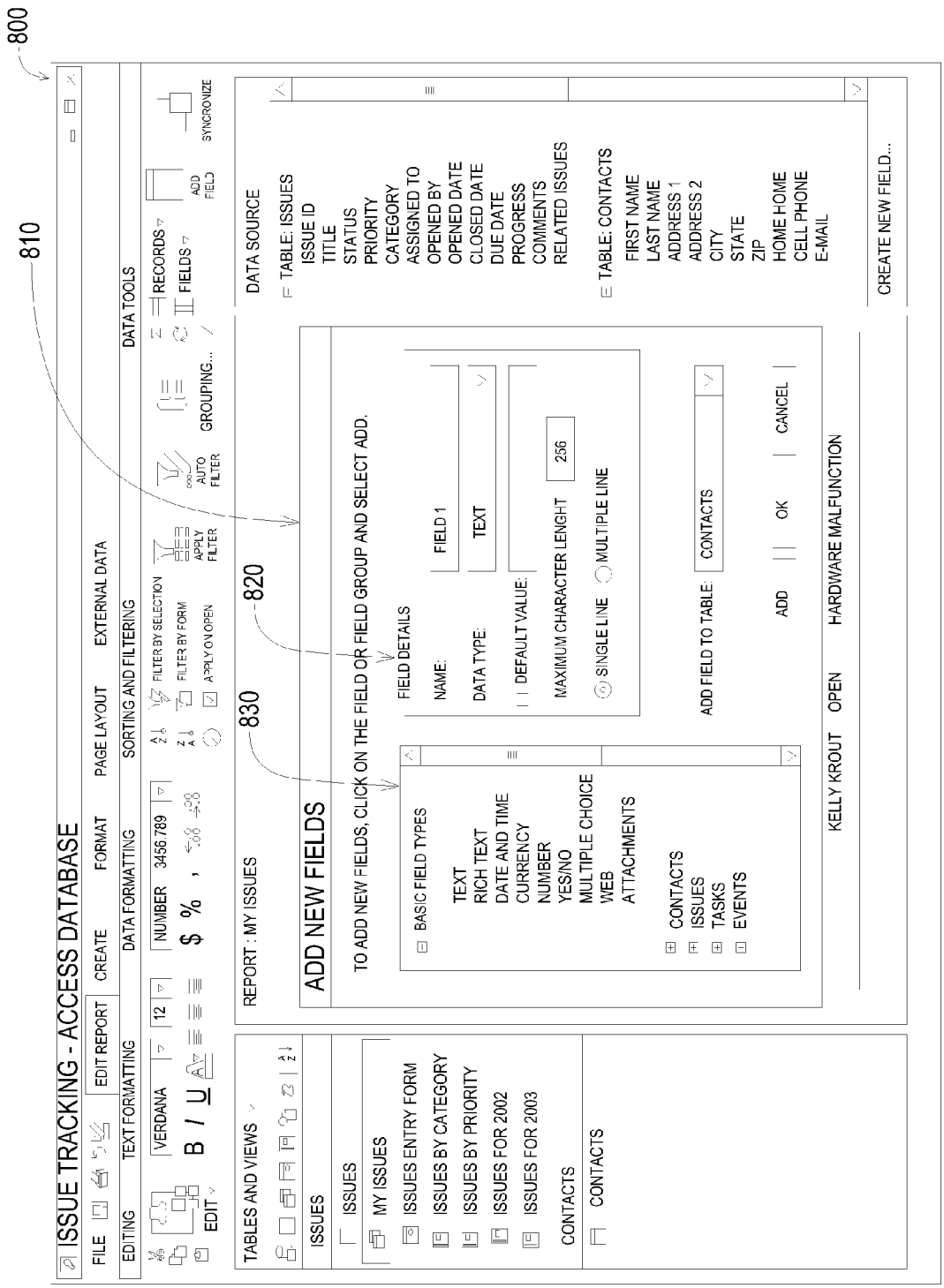
FIG. 8 illustrates a display of a dialog in an alternative user interface for adding a field to a table.

FIG. 8 illustrates a display of a dialog in an alternative user interface for adding a field to a table. The Figure illustrates a form that has been opened in browse mode as the result of clicking the "Create Field" button (740) in FIG. 7. Dialog 810 presents field templates 830 in addition to the facility 820 for the user to define a new field that is not contained in the list of templates. Since forms can be based on multiple table data sources, the embodiment allows the user to specify which underlying data source should be modified. Thus the embodiment uses the field template task pane a step further by providing an entry point from the data source task pane (which ties field template with other data sources) and by providing a facility for user to define a field not in the templates.

Exemplary Flow for Data Source Task Panes

Figure 9:
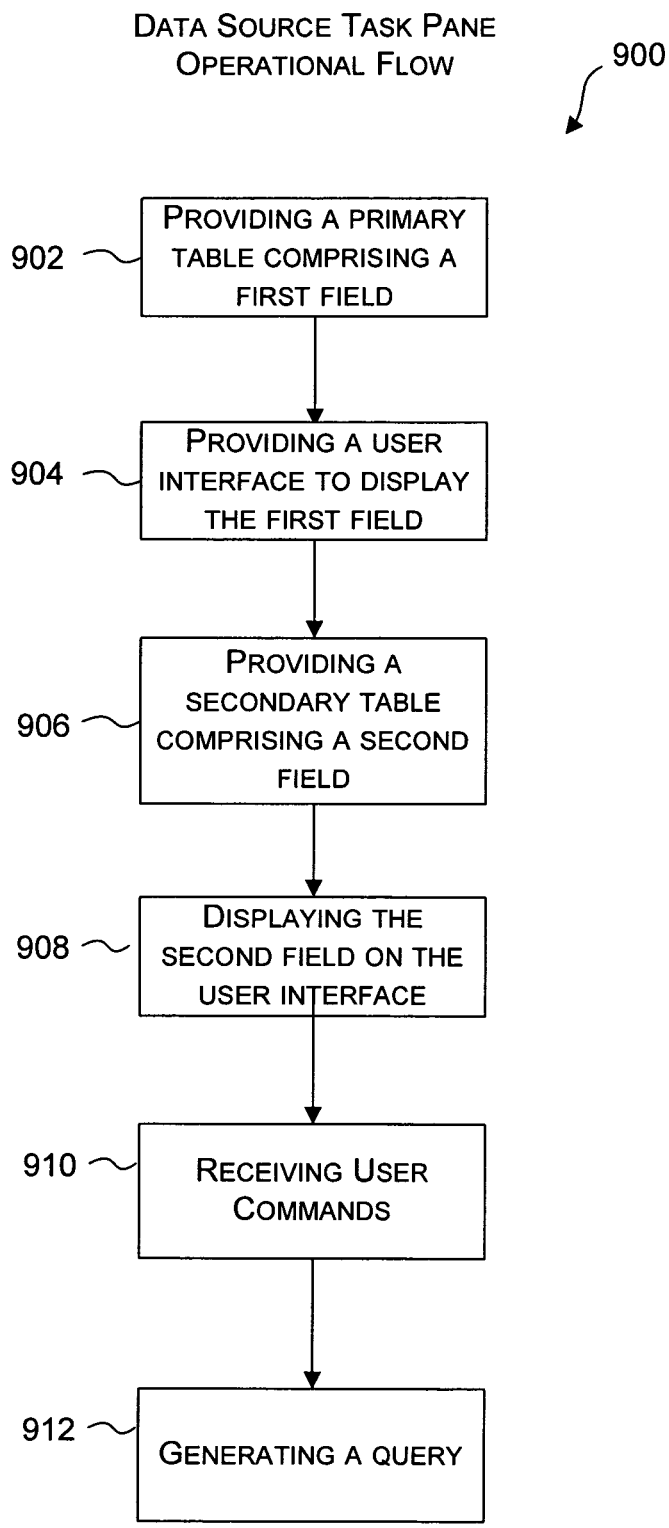
FIG. 9 illustrates an operational flow 900 for task panes.
Figure 10:
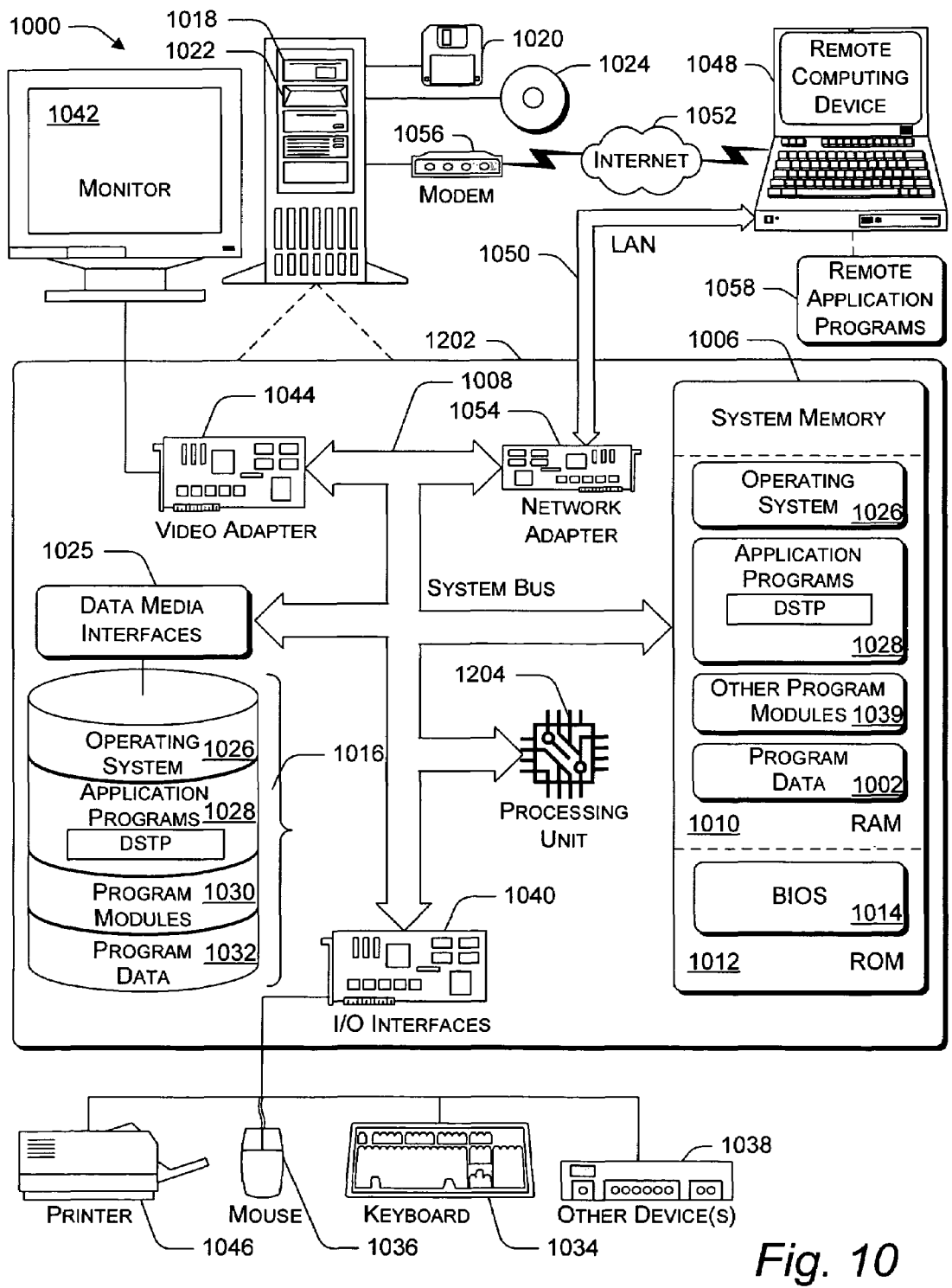
FIG. 10 illustrates a general computer environment 1000, which can be used to implement the techniques described herein.

FIG. 9 illustrates an operational flow 900 for task panes. Operational flow 900 may be performed in any suitable computing environment. For example, operational flow 900 may be executed by an application such as user application programs 1028 (FIG. 10, below) for data source task panes. Therefore, the description of operational flow 900 may refer to at least one of the components of FIG. 10. However, any such reference to components of FIG. 10 is for descriptive purposes only, and it is to be understood that the implementations of FIG. 10 are a non-limiting environment for operational flow 900.

At block 902, a primary table comprising a first field is provided. In various embodiments, the primary table can contain fields arranged in schemas, structures, user-defined lists and the like. Often the fields are arranged in a tree structure that is expandable and collapsible in accordance with the wishes of a user. In an embodiment, the table is shown with two levels of hierarchy, although more levels can be used.

At block 904, user interface is provided to display the first field for the primary table. The user interface can be configured to show the first table structure as a tree as described above. The first field is typically displayed using a first pane in the user interface. The user interface is configured to receive commands from the user for editing the structure of the first table. In an embodiment, a graphical user interface is provided to visually depict, for example, logical relationships within the table. Additionally, the user interface can be used to enter the data for the table.

At block 906, a secondary table comprising a second field is provided. In various embodiments, the secondary table can contain fields as described above and is often arranged in a tree structure that is expandable. In an embodiment, the table is shown with two levels of hierarchy, although more levels can be used.

At block 908, the second field for the secondary table is displayed on the user interface. The second field is typically displayed using a second pane in the user interface. The user interface is configured to receive commands from the user to use fields from the second table for editing (or otherwise creating, modifying, and the like) the structure of the first table.

At block 910, commands are received from the user for creating a relationship between the first and second fields. The commands for displaying the relationship can be interpreted and provisionally displayed on the user interface pending completion of the commands. When the commands are completed, the created relationship is displayed in the first pane. For example, selecting a displayed field from the secondary data source in the second pane of the user interface, dragging the selected field to the first pane, and dropping the selected field on a first field from the primary table causes a relationship to be formed between the first and second fields.

At block 912, a query is generated to produce a results set from the primary and secondary tables in accordance with the created relationship between the first and second fields. The generated query can be a sequence of one or more commands, such as SQL, for performing logical operations such as a join on a database.

As an example, "issues" is the primary table and "contacts" is the secondary table. Dragging a field from the secondary table to the primary table causes information related to the field from the secondary table to be interpreted in light of the first table. Dragging a "contact" to the "issues" table forms a one-to-many relationship from the contact table to the issues table. A query is generated in accordance with the user command and the results sent to a view surface as a list, for example, of all issues that are associated with a contact.

Illustrative Operating Environment

FIG. 10 illustrates a general computer environment 1000, which can be used to implement the techniques described herein. The computer environment 1000 is only one example of a computing environment and is not intended to suggest any limitation as to the scope of use or functionality of the computer and network architectures. Neither should the computer environment 1000 be interpreted as having any dependency or requirement relating to any one or combination of components illustrated in the example computer environment 1000.

Computer environment 1000 includes a general-purpose computing device in the form of a computer 1002. The components of computer 1002 can include, but are not limited to, one or more processors or processing units 1004, system memory 1006, and system bus 1008 that couples various system components including processor 1004 to system memory 1006.

System bus 1008 represents one or more of any of several types of bus structures, including a memory bus or memory controller, a peripheral bus, an accelerated graphics port, and a processor or local bus using any of a variety of bus architectures. By way of example, such architectures can include a Peripheral Component Interconnects (PCI) bus also known as a Mezzanine bus, a PCI Express bus (and the like), a Universal Serial Bus (USB), a Secure Digital (SD) bus, and/or an IEEE 1394, i.e., FireWire, bus.

Computer 1002 may include a variety of computer readable media. Such media can be any available media that is accessible by computer 1002 and includes both volatile and non-volatile media, removable and non-removable media.

System memory 1006 includes computer readable media in the form of volatile memory, such as random access memory (RAM) 1010; and/or non-volatile memory, such as read only memory (ROM) 1012 or flash RAM. Basic input/output system (BIOS) 1014, containing the basic routines that help to transfer information between elements within computer 1002, such as during start-up, is stored in ROM 1012 or flash RAM. RAM 1010 typically contains data and/or program modules that are immediately accessible to and/or presently operated on by processing unit 1004.

Computer 1002 may also include other removable/non-removable, volatile/non-volatile computer storage media. By way of example, FIG. 10 illustrates hard disk drive 1016 for reading from and writing to a non-removable, non-volatile magnetic media (not shown), magnetic disk drive 1018 for reading from and writing to removable, non-volatile magnetic disk 1020 (e.g., a "floppy disk"), and optical disk drive 1022 for reading from and/or writing to a removable, non-volatile optical disk 1024 such as a CD-ROM, DVD-ROM, or other optical media. Hard disk drive 1016, magnetic disk drive 1018, and optical disk drive 1022 are each connected to system bus 1008 by one or more data media interfaces 1025. Alternatively, hard disk drive 1016, magnetic disk drive 1018, and optical disk drive 1022 can be connected to the system bus 1008 by one or more interfaces (not shown).

The disk drives and their associated computer-readable media provide non-volatile storage of computer readable instructions, data structures, program modules, and other data for computer 1002. Although the example illustrates a hard disk 1016, removable magnetic disk 1020, and removable optical disk 1024, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1016, magnetic disk 1020, optical disk 1024, ROM 1012, and/or RAM 1010, including by way of example, operating system 1026, one or more application programs 1028 (which can include data source task panes as described above), other program modules 1030, and program data 1032. Each of such operating system 1026, one or more application programs 1028, other program modules 1030, and program data 1032 (or some combination thereof) may implement all or part of the resident components that support the distributed file system.

A user can enter commands and information into computer 1002 via input devices such as keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to processing unit 1004 via input/output interfaces 1040 that are coupled to system bus 1008, but may be connected by other interface and bus structures, such as a parallel port, game port, or a universal serial bus (USB).

Monitor 1042 or other type of display device can also be connected to the system bus 1008 via an interface, such as video adapter 1044. In addition to monitor 1042, other output peripheral devices can include components such as speakers (not shown) and printer 1046 which can be connected to computer 1002 via I/O interfaces 1040.

Computer 1002 can operate in a networked environment using logical connections to one or more remote computers, such as remote computing device 1048. By way of example, remote computing device 1048 can be a PC, portable computer, a server, a router, a network computer, a peer device or other common network node, and the like. Remote computing device 1048 is illustrated as a portable computer that can include many or all of the elements and features described herein relative to computer 1002. Alternatively, computer 1002 can operate in a non-networked environment as well.

Logical connections between computer 1002 and remote computer 1048 are depicted as a local area network (LAN) 1050 and a general wide area network (WAN) 1052. Such networking environments are commonplace in offices, enterprise-wide computer networks, intranets, and the Internet.

When implemented in a LAN networking environment, computer 1002 is connected to local area network 1050 via network interface or adapter 1054. When implemented in a WAN networking environment, computer 1002 typically includes modem 1056 or other means for establishing communications over wide area network 1052. Modem 1056, which can be internal or external to computer 1002, can be connected to system bus 1008 via I/O interfaces 1040 or other appropriate mechanisms. It is to be appreciated that the illustrated network connections are examples and that other means of establishing at least one communication link between computers 1002 and 1048 can be employed.

In a networked environment, such as that illustrated with computing environment 1000, program modules depicted relative to computer 1002, or portions thereof, may be stored in a remote memory storage device. By way of example, remote application programs 1058 reside on a memory device of remote computer 1048. For purposes of illustration, applications or programs and other executable program components such as the operating system are illustrated herein as discrete blocks, although it is recognized that such programs and components reside at various times in different storage components of computing device 1002, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method for relating tables for a database, the method comprising:
   providing a primary table comprising a first field;
   providing a user interface to display the first field;
   providing a secondary table comprising a second field;
   displaying on the user interface the second field;
   receiving commands from the user for creating a relationship between the first and second fields, wherein creating a relationship between the first and second fields comprises:
      receiving a selection of the second field displayed in the user interface;
      receiving a command to drag the selected second field to a first pane comprising the first field in the user interface; and
      receiving a command to drop the selected second field onto the first field in the user interface to create the relationship between the first and second fields, wherein the relationship comprises a one-to-many relationship from the secondary table to the primary table; and
   generating a query such that the generated query produces a results set from the primary and secondary tables in accordance with the relationship between the first and second fields, wherein the query is generated automatically upon receiving the commands to drag and drop the selected second field onto the first field in the user interface, and wherein other fields in the primary and secondary tables that are not in the query are distinguished from the first and second fields by at least one of a color and a font size of the first and second fields to distinguish the first and second fields from the other fields in the primary and secondary tables.

2. The method of claim 1 further comprising displaying the relationship between the first and second fields on the user interface.

3. The method of claim 1 further comprising displaying fields from the primary database in a first pane of the user interface and displaying fields from the secondary database in a second pane of the user interface.

4. The method of claim 1 wherein the generated query comprises commands for joining the primary and secondary tables.

5. The method of claim 1 further comprising receiving a command from the user to modify the generated query.

6. The method of claim 1 wherein the generated query comprises an SQL command.

7. The method of claim 1 further comprising displaying the result set in a list on the user interface.

8. A computer-implemented system for editing schema for a database, the system comprising:
   a memory for storing executable program code; and
   a processor, functionally coupled to the memory, the processor being responsive to computer-executable instructions contained in the program code and operative:
      to receive commands, in a user interface, from the user for the for creating a relationship between a first field from a primary table and a second field from a secondary table, wherein the first and second fields are displayed in the user interface, and
      to change a displayed image in response to the received commands, wherein creating a relationship between the first and second fields comprises:
         receiving a selection of the second field displayed in the user interface; receiving a command to drag the selected second field to a first pane comprising the first field in the user interface; and
         receiving a command to drop the selected second field onto the first field in the user interface to create the relationship between the first and second fields; and
      to generate a query, in a query generator, for producing a results set from the primary and secondary tables in accordance with the relationship between the first and second fields,
   wherein the query is generated automatically upon receiving the commands to drag and drop the selected second field onto the first field in the user interface, and
   wherein other fields in the primary and secondary tables that are not in the query are distinguished from the first and second fields by at least one of a color and a font size of the first and second fields to distinguish the first and second fields from the other fields in the primary and secondary tables.

9. The system of claim 8 wherein the user interface is configured to receive commands from the user for entering data related to the second field.

10. The system of claim 8, wherein the processor is further operative to comprising display the relationship between the first and second fields.

11. The system of claim 8 wherein the results set is displayed in a view as a database table.

12. The system of claim 8, wherein the processor is further operative to generate, in the query generator, SQL commands to perform logical operations.

13. The system of claim 8, wherein the processor is further operative to accept, in the user interface, commands from the user for modifying the generated query.

14. A computer-implemented system for generating queries for a database, the system comprising:
   a memory storage means for storing executable program code; and
   a processing means, functionally coupled to the memory storage means, the processing means being responsive to computer-executable instructions contained in the program code, the processing means being utilized by a computer:
      means for providing a primary table comprising a first field and for providing a secondary table comprising a second field;
      means for providing a user interface for displaying the first and second fields and for receiving commands from the user for creating a relationship between the first and second fields,
   wherein creating a relationship between the first and second fields comprises: receiving a selection of the second field displayed in the user interface;
   receiving a command to drag the selected second field to a first pane comprising the first field in the user interface; and receiving a command to drop the selected second field onto the first field in the user interface to create the relationship between the first and second fields; and means for generating a query such that the generated query is configured to produce a results set from the primary and secondary tables in accordance with the relationship between the first and second fields, wherein the query is generated automatically upon receiving the commands to drag and drop the selected second field onto the first field in the user interface, and wherein other fields in the primary and secondary tables that are not in the query are distinguished from the first and second fields by at least one of a color and a font size of the first and second fields to distinguish the first and second fields from the other fields in the primary and secondary tables.

15. The system of claim 14, wherein the user interface is provided for entering data into the database.

16. The system of claim 14, wherein the user interface is provided for displaying data from the results set.

17. The system of claim 16 wherein the displayed data is displayed as a report form.

18. The system of claim 17 wherein the user interface is an interactive user interface metaphor.

19. The system of claim 17 wherein the means for providing a user interface is configured to display a list of template schema definitions.

* * * * *